US012003706B2

(12) United States Patent
Lu et al.

(10) Patent No.: US 12,003,706 B2
(45) Date of Patent: *Jun. 4, 2024

(54) COMBINATION OF MODE-DEPENDENT AND FIXED TRANSFORM TYPES IN VIDEO CODING

(71) Applicant: Google LLC, Mountain View, CA (US)

(72) Inventors: Lester Lu, Los Angeles, CA (US); Debargha Mukherjee, Cupertino, CA (US); Elliott Karpilovsky, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/700,298

(22) Filed: Mar. 21, 2022

(65) Prior Publication Data

US 2022/0217336 A1 Jul. 7, 2022

Related U.S. Application Data

(63) Continuation of application No. 16/712,057, filed on Dec. 12, 2019, now Pat. No. 11,284,071.

(51) Int. Cl.
*H04N 19/107* (2014.01)
*H04N 19/122* (2014.01)
(Continued)

(52) U.S. Cl.
CPC ......... *H04N 19/107* (2014.11); *H04N 19/122* (2014.11); *H04N 19/176* (2014.11); *H04N 19/50* (2014.11)

(58) Field of Classification Search
None
See application file for complete search history.

(56) References Cited

U.S. PATENT DOCUMENTS 9,736,480 B2 * 8/2017 Lee ................. H04N 19/44
10,390,044 B2 8/2019 Karczewicz et al.
(Continued)

OTHER PUBLICATIONS

Bankoski et al., "VP8 Data Format and Decoding Guide", Independent Submission RFC 6389, Nov. 2011, 305 pp.
(Continued)

*Primary Examiner* — Chikaodili E Anyikire
(74) *Attorney, Agent, or Firm* — Young Basile Hanlon & MacFarlane, P.C.

(57) ABSTRACT

Decoding video data includes, for a block encoded using a prediction mode, determining a transform mode for the block using the prediction mode. The transform mode is a first mode when the prediction mode is an inter-prediction mode and is a second mode when the prediction mode is an intra-prediction mode. The first mode is an available first transform type that is a combination of transforms selected from first fixed transforms and first learned transforms that each comprise a respective transformation matrix generated iteratively using blocks predicted using the inter-prediction mode. The second mode is an available second transform type that is a combination of transforms selected from second fixed transforms, which is a proper subset of the first fixed transforms, and a second learned transform comprising a transformation matrix that is generated iteratively using blocks predicted using the intra-prediction mode. Decoding the block uses the prediction and transform modes.

20 Claims, 6 Drawing Sheets

(51) Int. Cl.
*H04N 19/176* (2014.01)
*H04N 19/50* (2014.01)

(56) References Cited

U.S. PATENT DOCUMENTS 10,750,181 B2* 8/2020 Huang ................. H04N 19/139
2018/0020218 A1 1/2018 Zhao et al.
2020/0236349 A1* 7/2020 Zhai ..................... H04N 19/172

OTHER PUBLICATIONS

Bankoski et al., "VP8 Data Format and Decoding Guide draft-bankoski-vp8-bitstream-02", Network Working Group, Internet-Draft, May 18, 2011, 288 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
Bankoski, et al., "Technical Overview of VP8, An Open Source Video Codec for the Web", Jul. 11, 2011, 6 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
"VP8 Data Format and Decoding Guide, WebM Project", Google On2, Dec. 1, 2010, 103 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
V. K. Goyal, "Theoretical foundations of transform coding," in IEEE Signal Processing Magazine, vol. 18, No. 5, pp. 9-21 (Sep. 2001).
C. Yeo, et al., "Mode-Dependent Transforms for Coding Directional Intra Prediction Residuals," IEEE Transactions on Circuits and Systems for Video Technology, vol. 22, No. 4, pp. 545-554 (Apr. 2012).
K. Zhao, et al., "Enhanced Multiple Transform for Video Coding," 2016 Data Compression Conference (DCC), Snowbird, UT (2016), pp. 73-82.
A. Arrufat, et al., "Rate-distortion optimised transform competition for intra coding in HEVC", IEEE VCIP, Dec. 2014, La Valette, Malta. pp. 73, hal-01112655f, 5 pgs.
X. Zhao, et al., "Video Coding with Rate-Distortion Optimized Transform," IEEE Transactions on Circuits and Systems for Video Technology, vol. 22, No. 1, pp. 138-151 (Jan. 2012).

* cited by examiner

COMBINATION OF MODE-DEPENDENT AND FIXED TRANSFORM TYPES IN VIDEO CODING

This application is a continuation of U.S. patent application Ser. No. 16/712,057, filed Dec. 12, 2019, the entire contents of which are incorporated herein in their entirety by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including lossless and lossy compression techniques.

SUMMARY

Transformation of video data into the frequency domain is one technique used to reduce the amount of data included in a video stream. Implementations of the teachings herein describe a combination of mode-dependent and fixed transforms in video coding. The design of the mode-dependent transforms are data driven to capture different characteristics of blocks from different modes.

An implementation of a method for decoding video data from a video bitstream comprises, for a respective block of a plurality of blocks encoded into the video bitstream using a prediction mode, determining a transform mode for the block using the prediction mode. The transform mode comprises a first transform mode responsive to the prediction mode being an inter-prediction mode, and the transform mode comprises a second transform mode responsive to the prediction mode being an intra-prediction mode of a plurality of available intra-prediction modes. The first transform mode comprises one of a plurality of available first transform types, each of the plurality of available first transform types comprising respective combinations of transforms selected from the group consisting of first fixed transforms, each comprising a respective fixed transformation matrix, and first mode-dependent, learned transforms, each comprising a respective transformation matrix that was generated iteratively using blocks predicted using the inter-prediction mode. The second transform mode comprises one of a plurality of available second transform types, each of the plurality of available second transform types comprising respective combinations of transforms selected from the group consisting of second fixed transforms, each comprising a respective fixed transformation matrix, wherein the second fixed transforms comprise a proper subset of the first fixed transforms, and a second mode-dependent, learned transform comprising a transformation matrix that is generated iteratively using blocks predicted using the intra-prediction mode. The method also includes decoding the block using the prediction mode and the transform mode.

In an aspect of this method, the available first transform types is greater in number than the available second transform types.

In an aspect of this method, the first mode-dependent, learned transforms include a first learned transform and a flipped version of the first learned transform, the second mode-dependent, learned transform includes a second learned transform, and the available second transform types omit a flipped version of the second learned transform.

In an aspect of this method, each of the first mode-dependent, learned transforms comprises a one-dimensional (1D) transform, the available first transform types comprise combinations of a vertical transform and a horizontal transform, and the vertical transform of a proper subset of the available first transform types includes at least one of the 1D transform or a flipped transform of the 1D transform.

In an aspect of this method, the first fixed transforms include a discrete cosine transform (DCT), and the horizontal transform of the proper subset of the available first transform types includes the DCT.

In an aspect of this method, each of the first mode-dependent, learned transforms comprises a one-dimensional (1D) transform, the available first transform types comprise combinations of a vertical transform and a horizontal transform, and the horizontal transform of a proper subset of the available first transform types includes one of the 1D transform or a flipped transform of the 1D transform.

In an aspect of this method, the first fixed transforms include a discrete cosine transform (DCT), and the vertical transform of the proper subset of the available first transform types includes the DCT.

An implementation of an apparatus for decoding video data from a video bitstream comprises a processor. The processor is configured to, for a block of a plurality of blocks encoded into the video bitstream using a prediction mode, determine a transform mode for the block using the prediction mode. The transform mode comprises a first transform mode responsive to the prediction mode being an inter-prediction mode, and the transform mode comprises a second transform mode responsive to the prediction mode being an intra-prediction mode of a plurality of available intra-prediction modes. The first transform mode comprises one of a plurality of available first transform types, each of the plurality of available first transform types comprising respective combinations of transforms selected from the group consisting of first fixed transforms, each comprising a respective fixed transformation matrix, and first mode-dependent, learned transforms, each comprising a respective transformation matrix that was generated iteratively using blocks predicted using the inter-prediction mode. The second transform mode comprises one of a plurality of available second transform types, each of the plurality of available second transform types comprising respective combinations of transforms selected from the group consisting of second fixed transforms, each comprising a respective fixed transformation matrix, wherein the second fixed transforms comprise a proper subset of the first fixed transforms, and a second mode-dependent, learned transform comprising a transformation matrix that is generated iteratively using blocks predicted using the intra-prediction mode. The processor is configured to decode the block using the prediction mode and the transform mode.

In an aspect of this apparatus, the available first transform types is greater in number than the available second transform types.

In an aspect of this apparatus, the first mode-dependent, learned transforms include a first learned transform, the available first transform types each include at least one of first learned transform or a flipped version of the first learned transform, the second mode-dependent, learned transform includes a second learned transform, and the available second transform types omit a flipped version of the second learned transform.

In an aspect of this apparatus, the second, mode-dependent learned transform is one a plurality of second, mode-dependent learned transforms, each generated iteratively using blocks predicted using a respective intra-prediction mode of the available intra-prediction modes, the second mode-dependent, learned transform comprises a one-dimensional (1D) transform, the available second transform types comprise combinations of a vertical transform and a horizontal transform, and the vertical transform of a proper subset of the available second transform types includes the 1D transform.

In an aspect of this apparatus, the second, mode-dependent learned transform is one a plurality of second, mode-dependent learned transforms, each generated iteratively using blocks predicted using a respective intra-prediction mode of the plurality of available intra-prediction modes, the second mode-dependent, learned transform comprises a one-dimensional (1D) transform, the available second transform types comprise combinations of a vertical transform and a horizontal transform, and the horizontal transform of a proper subset of the available second transform types includes the 1D transform.

In an aspect of this apparatus, the processor is configured to receive, from the video bitstream, a header associated with the block, and determine, from the header, the prediction mode. To determine the transform mode comprises to determine, from the prediction mode, that the transform mode is the first transform mode, and determine, from the header, that the first transform mode includes a first transform of the first mode-dependent, learned transforms.

In an aspect of this apparatus, the first fixed transforms comprise a discrete cosine transform (DCT), an asymmetric discrete sine transform (ADST), a flipped ADST (FLIPADST), and an identity transform, a first mode-dependent, learned transforms comprise a first learned transform (MDTX1) and a flipped MDTX1 (FMDTX1), the available first transform types comprise combinations of transforms selected from the group consisting of the DCT, the ADST, the FLIPADST, and the identity transform, and combinations of transforms selected from the group consisting of the MDTX1, the FMDTX1, and the DCT, the second fixed transforms comprise the DCT, the ADST, and the identity transform, and omit the FLIPADST, the second mode-dependent, learned transform comprises a second learned transform (MDTX2), and the available second transform types comprise combinations of transforms selected from the group consisting of the DCT, the ADST, and the identity transform, and combinations of transforms selected from the group consisting of the MDTX2 and the DCT.

In an aspect of this apparatus, the available first transform types for a proper subset of the available intra-prediction modes comprise only the first fixed transforms, and the available first transform types for remaining intra-prediction modes of the available intra-prediction modes comprise at least a first learned transform of the first mode-dependent, learned transforms. In some implementations of this aspect, at least some of the available first transform types for remaining intra-prediction modes of the available intra-prediction modes comprise a discrete cosine transform (DCT). The first fixed transforms may comprise the DCT, an asymmetric discrete sine transform (ADST), a flipped ADST (FLIPADST), and an identity transform.

An implementation of an apparatus for encoding video data into a video bitstream comprises a processor. The processor is configured to, for a respective block of a plurality of blocks of the video data, determine a transform mode for the block using a prediction mode for the block. The transform mode comprises a first transform mode responsive to the prediction mode being an inter-prediction mode, and the transform mode comprises a second transform mode responsive to the prediction mode being an intra-prediction mode of a plurality of available intra-prediction modes. The first transform mode comprises one of a plurality of available first transform types, each of the available first transform types comprising respective combinations of transforms selected from the group consisting of first fixed transforms, each comprising a respective fixed transformation matrix, and first mode-dependent, learned transforms, each comprising a respective transformation matrix that was generated iteratively using blocks predicted using the inter-prediction mode. The second transform mode comprises one of a plurality of available second transform types, each of the available second transform types comprising respective combinations of transforms selected from the group consisting of second fixed transforms, each comprising a respective fixed transformation matrix, wherein the second fixed transforms comprise a proper subset of the first fixed transforms, and a second mode-dependent, learned transform comprising a transformation matrix that is generated iteratively using blocks predicted using the intra-prediction mode. The processor is configured to encode the block into the video bitstream using the prediction mode and the transform mode.

In an aspect of this apparatus, the available first transform types is greater in number than the available second transform types.

In an aspect of this apparatus, the processor is configured to, when the transform mode is the second transform mode, encode, in a header associated with the block, a flag that indicates whether the transform mode includes the second mode-dependent transform; and encode, in the header associated with the block, bits indicating the transform mode from an index including those of the available second transform types including only the first fixed transforms or an index including those of the available second transform types including the second mode-dependent transform.

These and other aspects of this disclosure are disclosed in the following detailed description of the implementations, the appended claims, and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Video compression schemes may include breaking respective images, or frames, into smaller portions, such as blocks, and generating a compressed bitstream using techniques to limit the information included for respective blocks in the output. The compressed bitstream can be decoded to re-create the source images from the limited information. Typical video compression techniques include predicting a block and encoding the difference between the original block and the predicted block. This difference, often referred to as a residual, can be encoded using additional compression techniques such as transformation, quantization, and entropy coding.

In transformation, the image data of a block is transformed to the frequency domain using a transformation matrix of a transform. Various transforms are available, such as the Discrete Cosine Transform (DCT) or the Asymmetric Discrete Sine Transform (ADST). These transforms are described as fixed transform types herein because the transformation matrix of each is fixed without regard to the data of the block being transformed. Of the fixed transform types, some such as DCT and ADST work well for compression of residuals generated by various prediction modes, while others work well for compression of residuals generated by a fewer number of prediction modes.

Implementations of this disclosure enhance compression efficiency by adding mode-dependent transform types with fixed transform types for determination of transform type for a block. The mode-dependent transform types are data-driven, as they are trained, generated, or otherwise created using the data of residual blocks obtained from respective prediction modes. Each available prediction mode may be associated with a respective set of transform types that combine fixed transform types with mode-dependent transform types so that a transform type that maximizes compression of a block, regardless of its prediction mode.

Further details of generating mode-dependent, data-driven transform types and using them in combination with fixed transform types are described herein with initial reference to a system in which they can be implemented.

Figure 1:
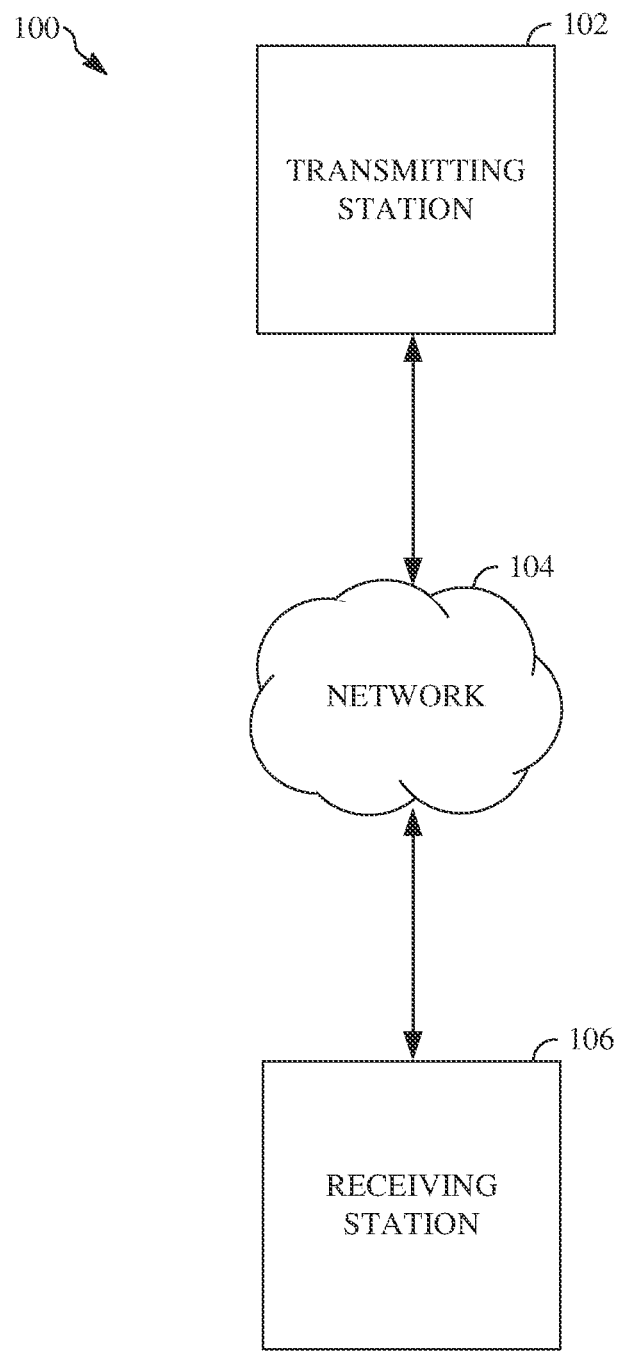
FIG. 1 is a schematic of an example of a video encoding and decoding system.

FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
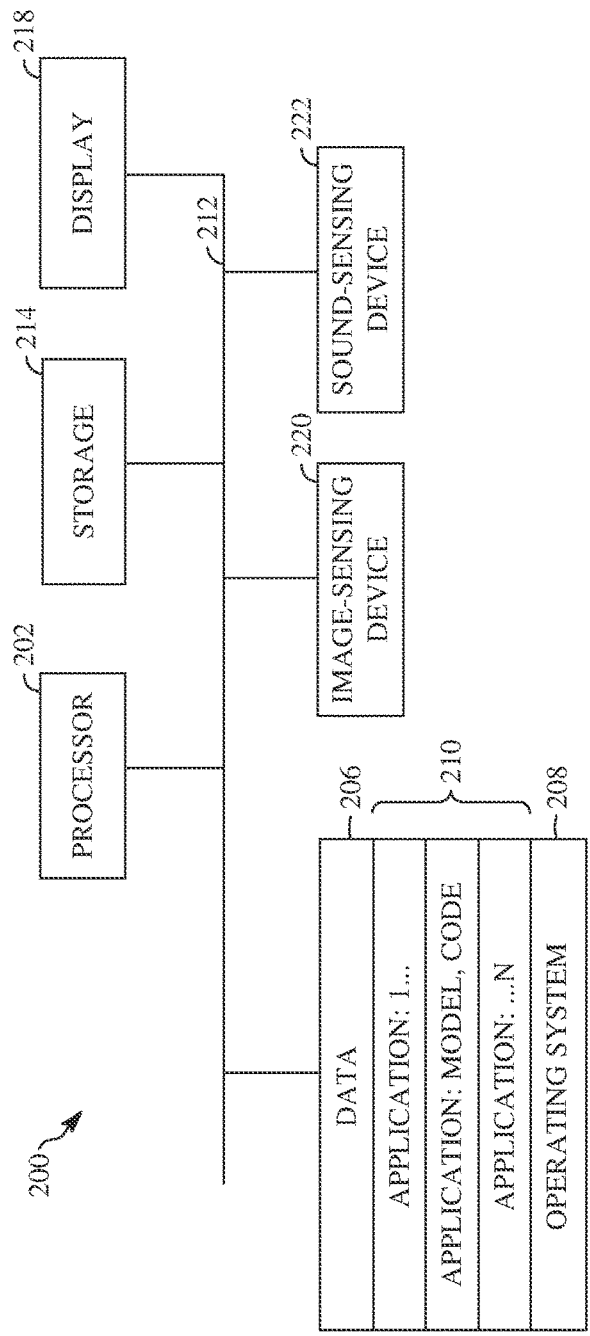
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random-access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a machine learning model production application and/or a video stream transcoding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated as a single unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
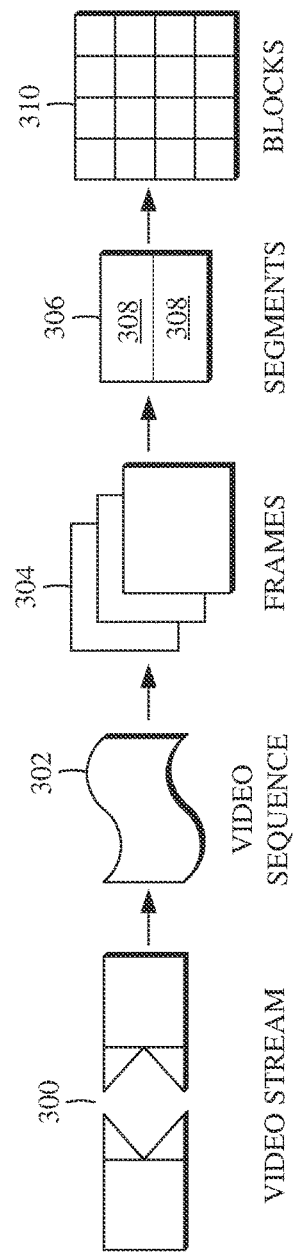
FIG. 3 is a diagram of an example of a video stream to be encoded and decoded.

FIG. 3 is a diagram of an example of a video stream 300 to be encoded and decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
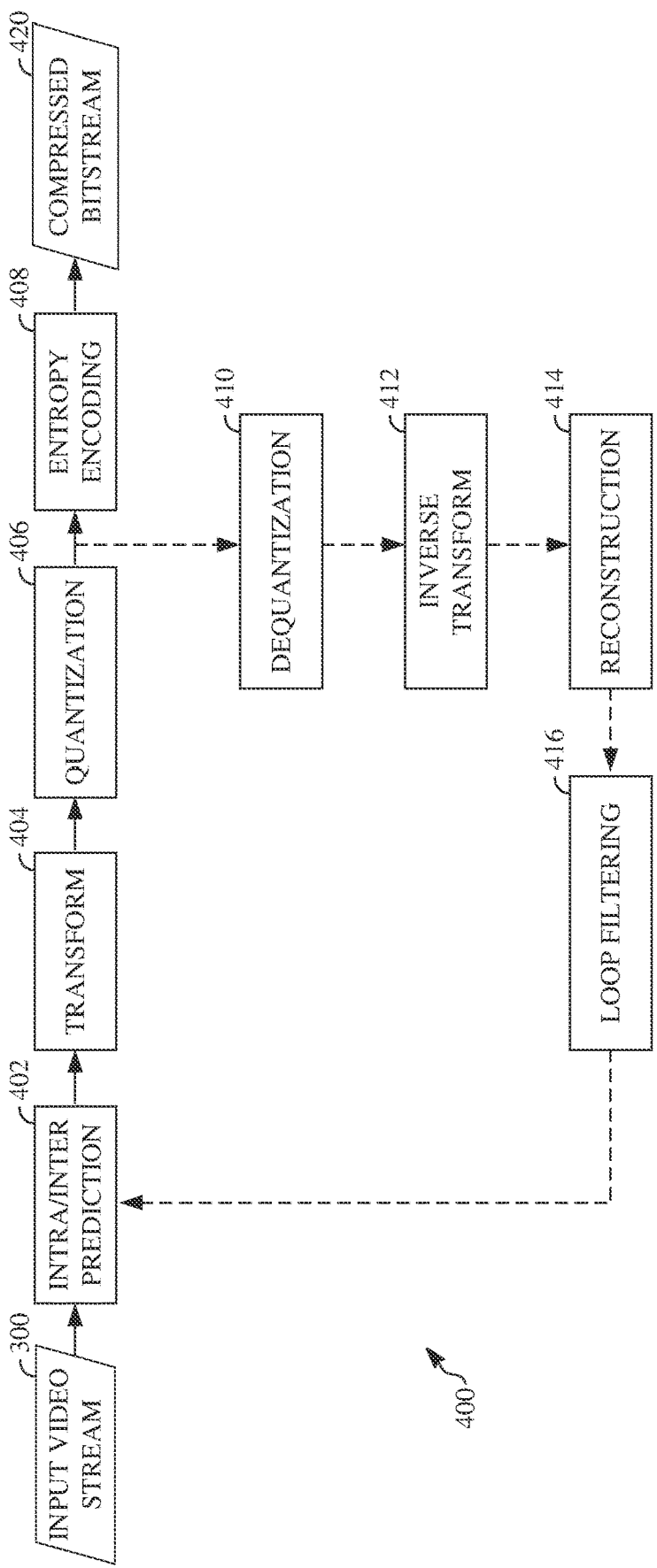
FIG. 4 is a block diagram of an example of an encoder.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

In some cases, the functions performed by the encoder 400 may occur after a filtering of the video stream 300. That is, the video stream 300 may undergo pre-processing according to one or more implementations of this disclosure prior to the encoder 400 receiving the video stream 300. Alternatively, the encoder 400 may itself perform such pre-processing against the video stream 300 prior to proceeding to perform the functions described with respect to FIG. 4, such as prior to the processing of the video stream 300 at the intra/inter prediction stage 402.

When the video stream 300 is presented for encoding after the pre-processing is performed, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can apply an in-loop filter or other filter to the reconstructed block to reduce distortion such as blocking artifacts. Examples of filters which may be applied at the loop filtering stage 416 include, without limitation, a deblocking filter, a directional enhancement filter, and a loop restoration filter.

Other variations of the encoder 400 can be used to encode the compressed bitstream 420. In some implementations, a non-transform-based encoder can quantize the residual signal directly without the transform stage 404 for certain blocks or frames. In some implementations, an encoder can have the quantization stage 406 and the dequantization stage 410 combined in a common stage.

Figure 5:
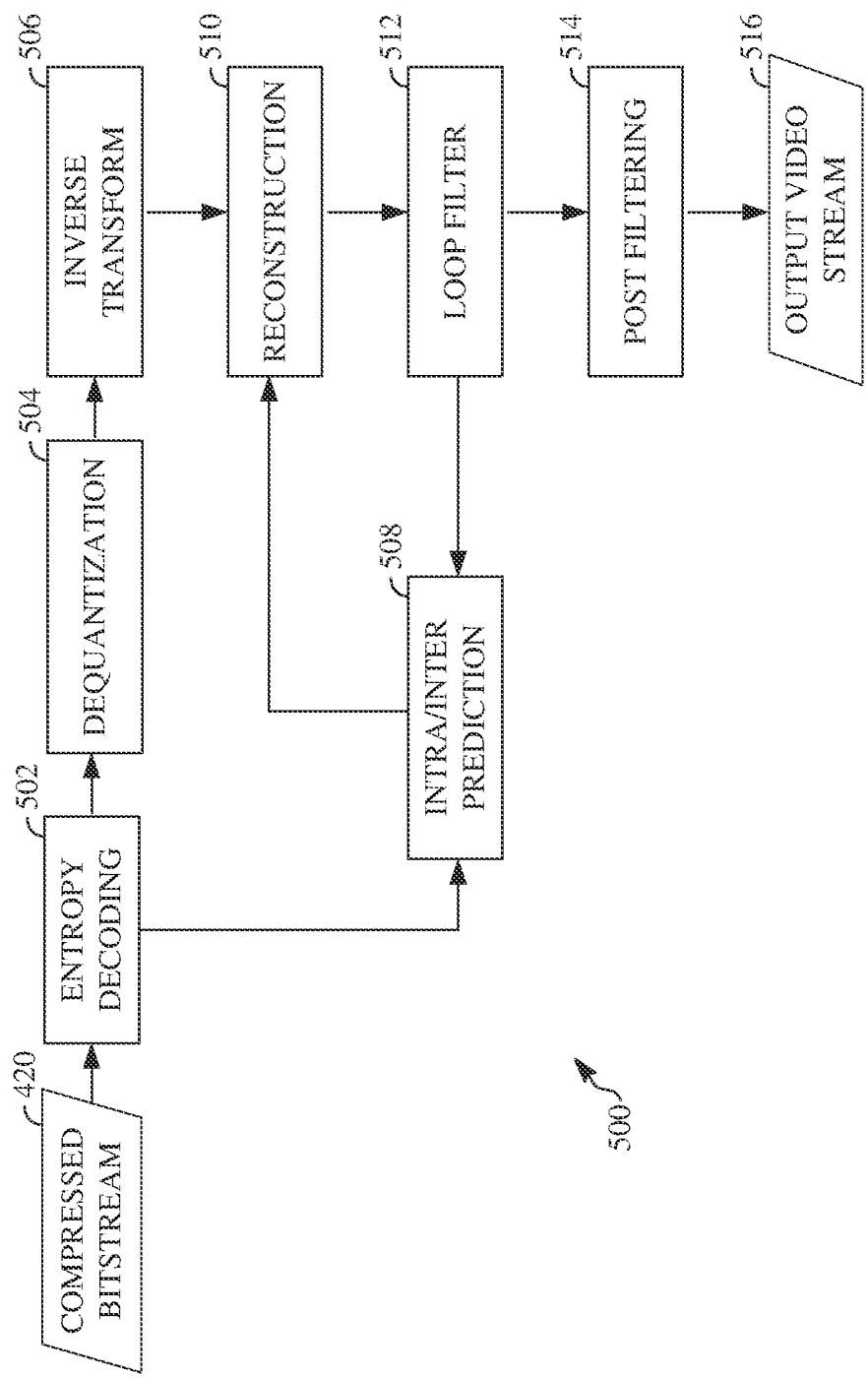
FIG. 5 is a block diagram of an example of a decoder.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a post filter stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Examples of filters which may be applied at the loop filtering stage 512 include, without limitation, a deblocking filter, a directional enhancement filter, and a loop restoration filter. Other filtering can be applied to the reconstructed block. In this example, the post filter stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the post filter stage 514 or otherwise omit the post filter stage 514.

Figure 6:
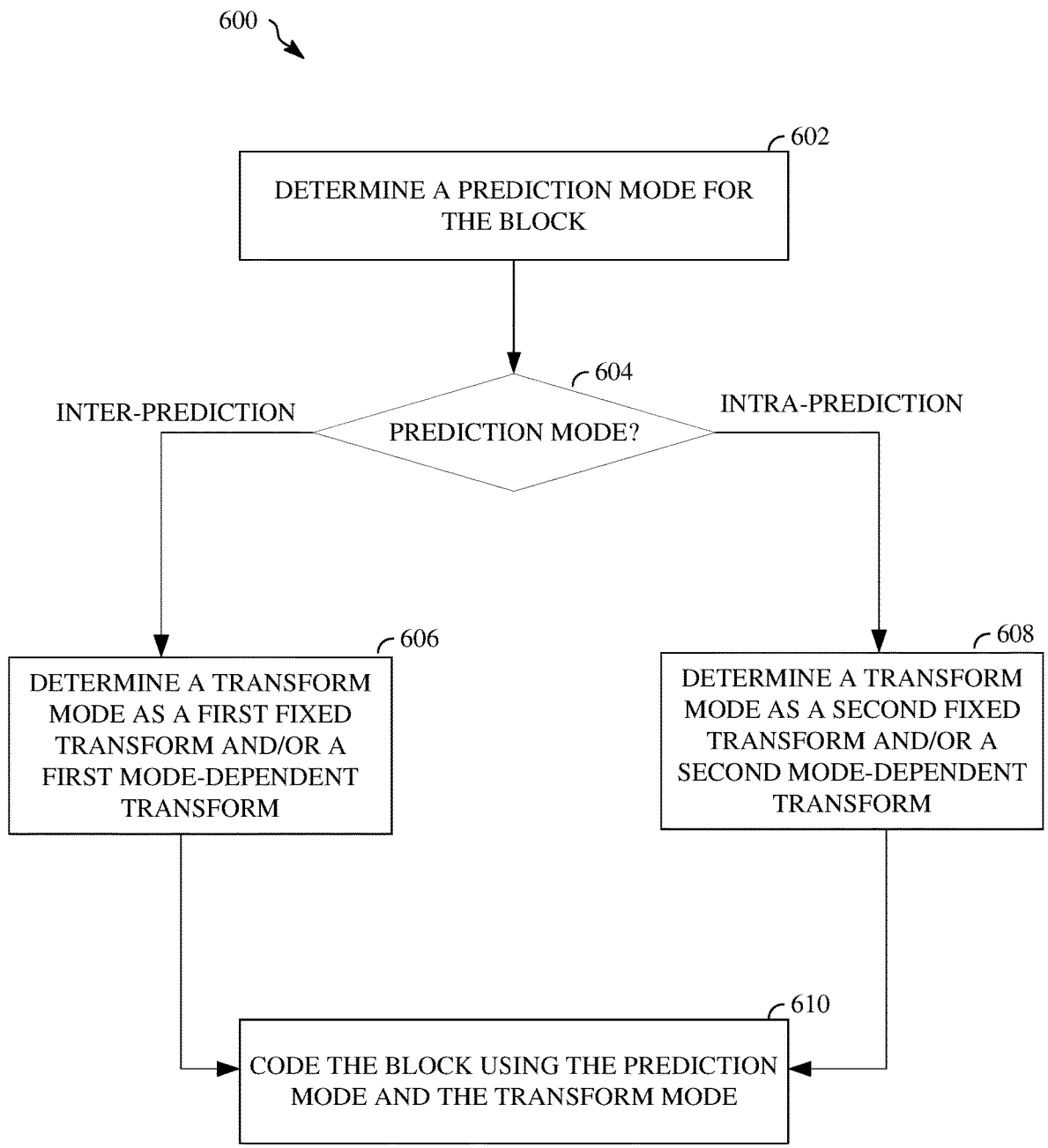
FIG. 6 is a flow diagram of a method for coding a block using a combination of mode-dependent and fixed transform types.

FIG. 6 is a flow diagram of a method 600 for coding a video block according to the teachings herein. The method 600 can be implemented by an encoder or decoder in the transmitting station 102 or the receiving station 106. The method 600 may be implemented by an encoder such as the encoder 400 and a decoder such as the decoder 500. The method 600 may be implemented by a processor, such as the processor 202, that is configured to perform the method 600. In some implementations, the method 600 may be implemented by a computer software program stored in memory, for example, the memory 204. The computer software program can include machine instructions that, when executed by a processor such as the processor 202, cause the encoder or decoder to code the video block in the manner described in FIG. 6. The method 600 can also be implemented by specialized hardware.

The method 600 includes determining a prediction mode for a block at 602. The prediction mode can comprise one of an inter-prediction mode or an intra-prediction mode of a plurality of intra-prediction modes. The number of intra-prediction modes is not limited. Commonly, the intra-prediction modes include both directional modes (e.g., horizontal, vertical, and multiple diagonal or angular modes) and non-directional modes (e.g., DC and true motion modes).

Determining the prediction mode can include determining a prediction mode at the intra/inter prediction stage 402 of the encoder 400. For example, an encoder can predict the block using several of the available prediction modes and select the prediction mode that results in the highest level of compression for a desired image quality. Determining the prediction mode can include performing a rate-distortion analysis that compares the number of bits needed to encode each of the residuals to the error in a resulting reconstructed block as compared to the original block.

The method 600 includes determining a transform type (also called a transform mode) for the block, which depends on whether the prediction mode is an inter-prediction mode or an intra-prediction mode of the intra-prediction modes, as shown at 604. The transform mode comprises a first transform mode, which is one of a first plurality of available transform types (e.g., a plurality of available first transform types) responsive to the prediction mode being the inter-prediction mode, and a second transform mode, which is one of second plurality of available transform types (e.g., a plurality of available second transform types) responsive to the prediction mode being the intra-prediction mode. The first plurality of available transform types comprises first fixed transforms, the second plurality of available transform types includes second fixed transforms, and the first fixed transforms and the second fixed transforms have at least some fixed transforms in common.

When the prediction mode is an inter-prediction mode, a combination of a first fixed transform and/or a first mode-dependent transform from the first plurality of available transform types is determined as the transform mode at 606. When the prediction mode is an intra-prediction mode, a combination of a second fixed transform and/or a second mode-dependent transform from the second plurality of available transform types is determined as the transform mode at 608.

For example, two-dimensional (2D) fixed transforms may include the following transforms: DCT, ADST, the flipped ADST (FLIPADST), and the identity transform. The 2D transforms may comprise combinations of four one-dimensional (1D) transforms. Accordingly, the fixed transform types that are available include sixteen 2D transforms comprising combinations of four 1D transforms as follows: DCT_DCT (transform rows with DCT and columns with DCT), ADST_DCT (transform rows with ADST and columns with DCT), DCT_ADST (transform rows with DCT and columns with ADST), ADST_ADST (transform rows with ADST and columns with ADST), FLIPADST_DCT (transform rows with FLIPADST and columns with DCT), DCT_FLIPADST (transform rows with DCT and columns with FLIPADST), FLIPADST_FLIPADST (transform rows with FLIPADST and columns with FLIPADST), ADST_FLIPADST (transform rows with ADST and columns with FLIPADST), FLIPADST_ADST (transform rows with FLIPADST and columns with ADST), IDTX (transform rows with identity and columns with identity), V_DCT (transform rows with identity and columns with DCT), H_DCT (transform rows with DCT and columns with identity), V_ADST (transform rows with identity and columns with ADST), H_ADST (transform rows with ADST and columns with identity), V_FLIPADST (transform rows with identity and columns with FLIPADST), and H_FLIPADST (transform rows with FLIPADST and columns with identity).

In this example the first fixed transform types can include some or all of these sixteen fixed transform types. The first fixed transform types and the second fixed transform types have at least some fixed transform types in common, as previously described. Thus, the second fixed transform types can include some or all of these fixed transform types.

Because residuals resulting from inter-prediction tend to have symmetrical statistics, but those resulting from intra-prediction generally do not, the second fixed transforms can comprise a proper subset of the first fixed transforms by excluding FLIPADST. In an example, the second fixed transform types include combinations of seven transforms: DCT_DCT, ADST_DCT, DCT_ADST, ADST_ADST, IDTX, V_DCT, and H_DCT.

The first plurality of available transform types comprises, in addition to those formed using only first fixed transforms, first mode-dependent transform types. Each first mode-dependent transform type uses a first learned transform generated using blocks predicted by the inter-prediction mode. Generating the first learned transform will be described below with regards to FIG. 7.

The first learned transform may comprise a one-dimensional (1D) transform, which may be referred to herein as a first 1D transform (MDTX1). As mentioned above, inter-predicted residuals tend to exhibit symmetrical statistics. For this reason, the flipped version of the first learned transform may also be considered when proposing the first mode-dependent transform types for the inter-prediction mode. The first mode-dependent transform types can comprise combinations of a vertical transform (for columns) and a horizontal transform (for rows). At least one of the vertical transform or the horizontal transform of each of the first mode-dependent transform types includes the 1D transform or the flipped transform (or version) of the 1D transform (FMDTX1). Accordingly, the vertical transform, the horizontal transform, or both can include MDTX1. Similarly, the vertical transform, the horizontal transform, or both can include FMDTX1.

In some implementations, the first mode-dependent transform types may be 2D transforms including combinations of 1D transforms including MDTX1 and FMDTX1. At least some of the first mode-dependent transform types may also include a fixed transform in the combinations. In an example, the fixed transform included in at least some of the first mode-dependent transform types is the DCT. In this example, eight additional 2D transforms are provided for inter-predicted blocks. Namely, the first mode-dependent transform types can comprise 2D transforms comprising a vertical transform combining MDTX1 with MDTX1 and a horizontal transform combining MDTX1 with MDTX1 (MDTX1_MDTX1), a vertical transform combining MDTX1 with MDTX1 and a horizontal transform combining FMDTX1 with FMDTX1 (FMDTX1_MDTX1), a vertical transform combining MDTX1 with MDTX1 and a horizontal transform combining DCT with DCT (DCT_MDTX1), a vertical transform combining FMDTX1 with FMDTX1 and a horizontal transform combining MDTX1 with MDTX1 (MDTX1_FMDTX1), a vertical transform combining FMDTX1 with FMDTX1 and a horizontal transform combining DCT with DCT (DCT_FMDTX1), a vertical transform combining FMDTX1 with FMDTX1 and a horizontal transform combining FMDTX1 with FMDTX1 (FMDTX1_FMDTX1), a vertical transform combining DCT with DCT and a horizontal transform combining MDTX1 with MDTX1 (MDTX1_DCT), and a vertical transform combining DCT with DCT and a horizontal transform combining FMDTX1 with FMDTX1 (FMDTX1_DCT).

The second plurality of available transform types comprises, in addition to those formed using only the second fixed transform types, second mode-dependent transform types. Each second mode-dependent transform type is based on a second learned transform generated using blocks predicted by the intra-prediction mode. Generating the second learned transform will be described below with regards to FIG. 7.

The second learned transform may comprise a one-dimensional (1D) transform, which may be referred to herein as a second 1D transform (MDTX2). As mentioned above, intra-predicted residuals tend to exhibit diverse statistical properties. For this reason, the flipped version of the second learned transform may be omitted when proposing the second mode-dependent transform types for the intra-prediction mode. The second mode-dependent transform types can comprise combinations of a vertical transform (for columns) and a horizontal transform (for rows). At least one of the vertical transform or the horizontal transform of each of the second mode-dependent transform types includes the 1D transform. Accordingly, the vertical transform, the horizontal transform, or both can include MDTX2.

In some implementations, the second mode-dependent transform types may be 2D transforms including combinations of 1D transforms including MDTX2 and, in at least some of the second mode-dependent transform types, a fixed transform. In an example, the fixed transform included in at least some of the second mode-dependent transform types is the DCT. In this example, three additional 2D transforms types are available for an intra-predicted block. Namely, the second mode-dependent transform types can comprise 2D transforms comprising a vertical transform combining MDTX2 with MDTX2 and a horizontal transform combining MDTX2 with MDTX2 (MDTX2_MDTX2), a vertical transform combining MDTX2 with MDTX2 and a horizontal transform combining DCT with DCT (DCT_MDTX2), and a vertical transform combining DCT with DCT and a horizontal transform combining MDTX2 with MDTX2 (MDTX2_DCT).

While the description of intra-prediction mode refers to one intra-prediction mode by example, each intra-prediction mode of the plurality of intra-prediction modes is associated with a respective second plurality of available transform types. All of the intra-prediction modes can share the second fixed transform types. Some of the fixed transforms in the set of second fixed transform types may differ for different intra-prediction modes. The respective second plurality of available transform types for an intra-predicted block may have respective second mode-dependent transforms, each based on a respective second learned transform generated using blocks predicted using the intra-prediction mode of the intra-predicted block. For example, where there are thirteen intra-prediction modes, there are 13 second learned transforms.

The examples above describe that the available transform types differ with the prediction mode of a block. The available transform types may also differ with the size of a block. For example, smaller prediction blocks such as 4×4 and 8×8 may determine a transform type from the 16 fixed transforms and 8 mode-dependent transforms described above when inter-predicted, while larger prediction blocks may use fewer or more transforms for the first plurality of available transform types (e.g., a different number of first fixed transforms). Smaller prediction blocks such as 4×4 and 8×8 may determine a transform type from the 7 fixed transforms and the 3 mode-dependent transforms described above that depend upon an intra-prediction mode. Larger prediction blocks may use fewer or more transforms for the second plurality of available transform types (e.g., a different number of second fixed transforms). At least one learned transform may be generated for each block size, in addition to for each prediction mode (e.g., the inter-prediction mode and each intra-prediction mode of the plurality of intra-prediction modes).

For determining the transform mode in these examples, one additional mode-dependent transform is generated for the inter-prediction mode, and one additional mode-dependent transform is generated for each intra-prediction mode. More than one additional mode-dependent transform can be generated for the inter-prediction mode, one or more intra-prediction modes, or both.

Determining the transform mode can include determining a transform mode at the transform stage 404 of the encoder 400. For example, an encoder can apply several of the available transform types for the prediction mode determined at 602 to the residual and select the one that results in the highest level of compression for a desired image quality as the transform mode. Determining the transform mode can include performing a rate-distortion analysis that compares the number of bits needed to encode each of the transformed residuals to the error in a resulting reconstructed block as compared to the original block. Determining the transform mode may be combined with determining the prediction mode in a common rate-distortion loop such that various prediction modes for a block may be analyzed in combination with different available transform types.

Finally, at 610, the method 600 codes the block using the prediction mode and the transform mode. For example, coding the block can include quantizing the transform coefficients that result from transforming the residual resulting from the determined prediction mode using the determined transform mode. The transform coefficients may be quantized at the quantization stage 406 of the encoder 400. Then, the quantized transform coefficients are entropy coded for inclusion in a compressed bitstream. The quantized transform coefficients may be entropy coded at the entropy encoding stage 408, for example, using any entropy coding technique.

The bitstream may also include bits identifying the prediction mode, the transform mode, or both. The bits may be included in a frame header, a slice header, a block header, or some combination of these headers associated with the block. In some implementations, a flag indicating whether the transform mode is a mode-dependent transform type or is a fixed transform type is encoded in a header associated with the block. Bits identifying the transform mode may also be encoded in the header associated with the block. The number of bits and the sequence in which they are arranged may vary, such as depending upon the number of available transform types.

The block as reconstructed may be made available for prediction of other blocks using a reconstruction or decoder loop of the encoder. For example, quantized transform coefficients from the quantization stage may be dequantized, such as at the dequantization stage 410, the dequantized transform coefficients may be inverse transformed using the determined transform type, such as at the inverse transform stage 412, and the resulting residual may be added to the prediction block determined by the prediction mode to reconstruct the block, such as at the reconstruction stage 414.

The method 600 can also be performed at a decoder, such as the decoder 500. At 602, a prediction mode is determined for the block (i.e., the current block to be decoded). The decoder 500 may receive a header associated with the block. The header may be a frame header, a slice header, a block header, or some combination of these headers. The prediction mode may be indicated in the header.

Determining the transform mode may depend upon the prediction mode at 604. Decoding a flag from the header indicates whether the transform mode is a fixed transform type or a mode-dependent transform type and decoding bits from the header indicates the transform mode. For example, where the prediction mode is the inter-prediction mode, decoding the flag and decoding the bits determines that the transform mode is a first fixed transform type or a first mode-dependent transform type at 606. In another example, where the prediction mode is the intra-prediction mode, decoding the flag and decoding the bits determines that the transform mode is a second fixed transform type or a second mode-dependent transform type at 608. The bits may signal an index to a list of available transform types to indicate the transform mode.

The number of flags and an indicator or index of the transform type may depend upon the number of available transform types. In an example as described above with 16 fixed transform types and 8 mode-dependent transform types associated with the inter-prediction mode, and the 7 fixed transform types and the 3 mode-dependent transform types associated with an intra-prediction mode, determining the prediction mode for the block comprises decoding a first flag of the encoded bitstream. The first flag can indicate whether the prediction mode comprises the inter-prediction mode or the intra-prediction mode. Thus, the first flag can be a 1-bit flag. Determining the transform mode for the block comprises decoding a second flag of an encoded bitstream after the first flag and decoding an indicator or index of the transform type of the encoded bitstream after the second flag. This sequence allows the index to comprise a maximum of 4 bits, which allows for easier entropy coding of the index in codecs that support at most 16 values per symbol. In some implementations, more or fewer flags may be used.

When the first flag indicates that the prediction mode is the inter-prediction mode, the second flag may be an inter mode-dependent transform flag indicating whether the transform mode is one of the first mode-dependent transform types (e.g., one including at least one of MDTX1 or FMDTX1) or not. When the first flag indicates that the prediction mode is the intra-prediction mode, the second flag may be an intra mode-dependent transform flag indicating whether the transform mode is one of the second mode-dependent transform types (e.g., one including MDTX2) or not. In this way, the second flag can also be a 1-bit flag.

The indicator or index identifies one of the first mode-dependent transform types as the transform mode when the second flag is the inter mode-dependent transform flag and the inter mode-dependent transform flag indicates the transform mode is one of the first mode-dependent transform types, and otherwise identifies one of the first fixed transform types as the transform mode. The indicator or index identifies one of the second mode-dependent transform types as the transform mode when the second flag is the intra mode-dependent transform flag and the intra mode-dependent transform flag indicates the transform mode is one of the second mode-dependent transform types, and otherwise identifies one of the second fixed transform types as the transform mode. In either situation, the indicator can be a sequence of bits, and may signal an index to a list of transform types as the transform mode. In the example where there are up to 16 available transform modes, the indicator may comprise 4 bits.

Once the prediction mode and transform mode are known, the method 600 codes the block at 610. For example, the quantized transform coefficients after entropy decoding, such as at the entropy decoding stage 502, may be dequantized, such as at the dequantization stage 504. The dequantized transform coefficients may then be inverse transformed using the determined transform mode, such as at the inverse transform stage 506. The residual results from the inverse transformation may be added to the prediction block determined by the prediction mode and generated at the intra/inter prediction stage 508 to reconstruct the block, such as at the reconstruction stage 510. The reconstructed block is then filtered according to the filters associated with the particular decoder in use.

Figure 7:
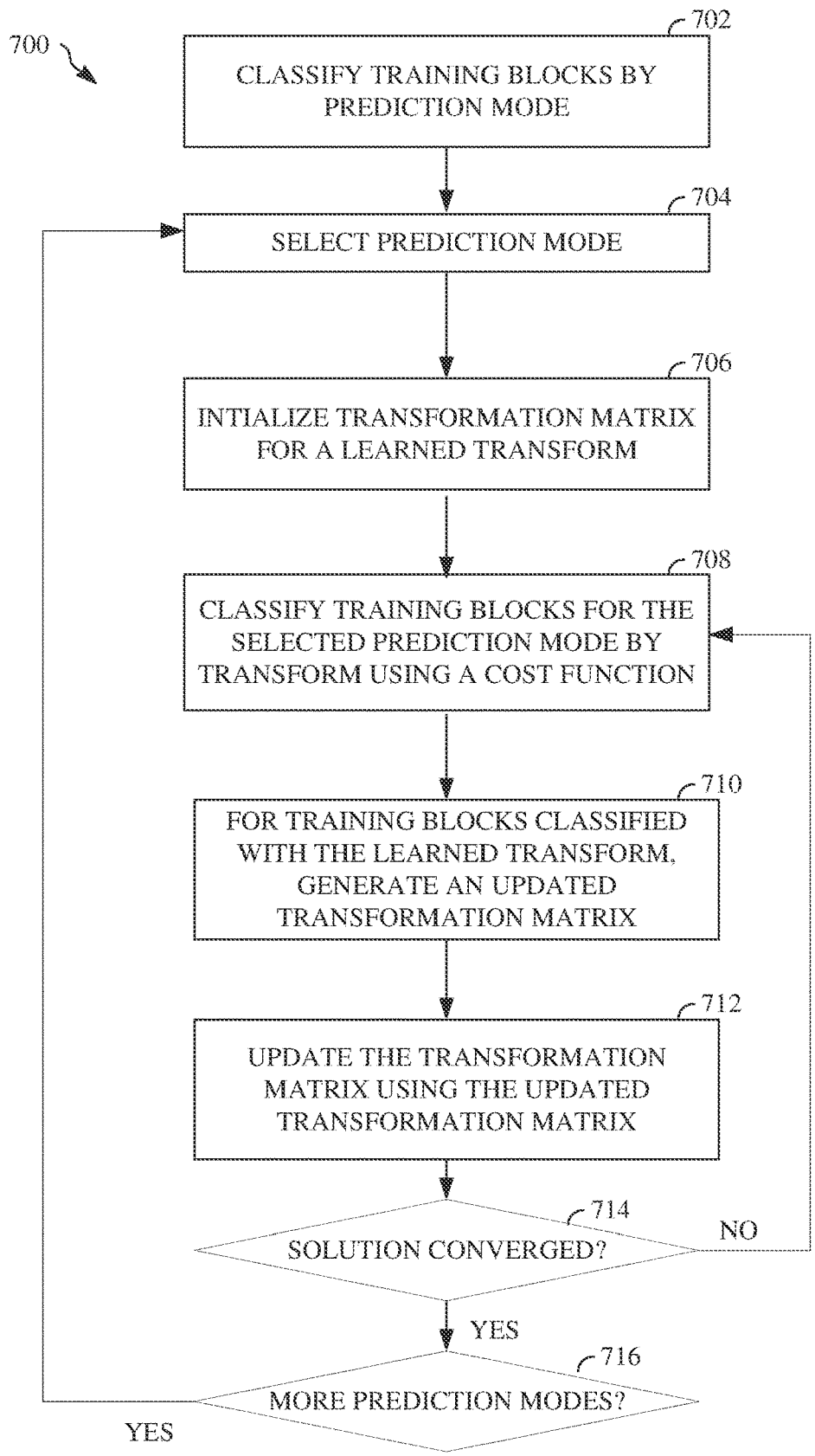
FIG. 7 is a flow diagram of a method for generating a mode-dependent transform type for prediction modes.

FIG. 7 is a flow diagram of a method 700 for generating a mode-dependent transform for prediction modes. The mode-dependent transform may be used with one or more fixed transforms for video compression. The method 700 may be performed by a processor located at a transmitting station, such as the transmitting station 102. The processor may be a device separate from an encoder and may provide results for use by an encoder and decoder.

The method 700 includes, at 702, classifying training blocks by the prediction mode used to predict a respective training block. The training blocks may be generated from various video sequences provided to the method 700 by starting with blocks (e.g., of the same size), partitioning the blocks into prediction blocks that form the training blocks, and determining a respective prediction mode for the training blocks. The respective prediction modes may be determined similarly to the process described with respect to using an encoder to implement the method 600 at 602. The video sequences used may be coded at different target bitrates to generate the training blocks. In some implementations, the method 700 does not classify the training blocks, but instead receives the training blocks as classified from another device performing a different method (such as a separate rate-distortion analysis) or previously produced data stored in memory.

In this example, the method 700 may be performed for each prediction mode of a plurality of prediction modes, wherein the plurality of prediction modes comprises one of an inter-prediction mode or an intra-prediction mode of a plurality of intra-prediction modes. The plurality of prediction modes may include all available prediction modes or may exclude certain prediction modes where use of a mode-dependent transform yields only a small coding improvement. For example, testing of the teachings herein determined that blocks predicted according to certain intra-prediction modes, such as D203_PRED in the AV1 codec, rarely selected the mode-dependent transform types associated with the intra-prediction mode in favor of fixed transform types. Such intra-prediction modes may not be included in generating mode-dependent transforms for inclusion in the available transform types or may be excluded from selecting a transform mode from such transform types (e.g., may use another transform selection technique other than the method 600).

At 706, a transformation matrix for a learned transform is initialized. The elements of the transformation matrix are not particularly limited, but they should be different from the transformation matrix of the other transforms used in the training. Some techniques for generating a transformation matrix (e.g., the solution of the learning) depends on the initialized values. Accordingly, different initialized transformation matrices may be considered. The elements of the transformation matrix may be selected to mimic the symmetrical properties of a Karhunen-Loève transform (KLT) in some examples. The KLT is a transform whose transformation matrix is derived from the properties of the prediction residual of a block. Accordingly, the KLT can achieve optimal energy compactness when it is the only transform used for the prediction residual. However, it may be less efficient than using multiple transform in combination. The elements of the transformation matrix be a KLT of a first one of the training blocks to be classified in some examples. The elements in the transformation matrix correspond to the arrangement of the residual (e.g., a 4×4 transformation matrix is initialized for a 4×4 residual, and an 8×8 transformation matrix is initialized for an 8×8 residual).

After initialization, a plurality of iterations occurs where the training blocks predicted using the current prediction mode are classified by transform at 708, the training blocks classified with the learned transform are used to generate an updated transformation matrix at 710, and the transformation matrix is updated using the updated transformation matrix at 712.

Classifying the training blocks by transform at 708 may include classify a training block into one of a first plurality of transforms responsive to the prediction mode being the inter-prediction mode, or one of a second plurality of transforms responsive to the prediction mode being the intra-prediction mode. The first plurality of transforms includes first fixed transforms and first mode-dependent transforms that include the learned transform and a flipped transform of the learned transform (e.g., solving to MDTX1, FMDTX1 described with regards to FIG. 6). The second plurality of transforms includes second fixed transforms and a second mode-dependent transform that includes the learned transform (e.g., solving to MDTX2 for respective intra-prediction modes as described with regards to FIG. 6). The first fixed transforms and the second fixed transforms have at least some fixed transforms in common.

In an example where the prediction mode is the inter-prediction mode, four 1D transforms can be used as the first fixed transforms, namely DCT, ADST, FLIPADST, and IDTX. Thus, the iterations classify inter-predicted training blocks into a DCT set, an ADST set, a FLIPADST set, an IDTX set, a learned transform set, also referred to as an MDTX1 set to distinguish the learned transform of inter-prediction from those of intra-prediction, and the flipped learned transform set, also referred to as an FMDTX1 set to maintain consistent language. For each intra-prediction mode, three 1D transforms can be used as the second fixed transforms, namely DCT, ADST, and IDTX. Thus, the iterations classify inter-predicted training blocks into a DCT set, an ADST set, an IDTX set, and a learned transform set, also referred to as an MDTX2 set to distinguish the learned transforms of intra-prediction from that of inter-prediction.

Classifying the training blocks by transform at 708 can include performing the classification using a cost function. This can include determining a respective output of the cost function resulting from transforming a respective training block (i.e., the residual) by each available transform for the prediction mode and selecting the available transform with the lowest output to classify the training block. An example of performing the classification using a cost function is next described.

Assume a transform $U=(u_1, \ldots, u_n)$, where n is the number of elements in the transform, the transform coefficients of a length-n block x will be $(u_1^T x, \ldots, u_n^T x)$. Ideally, an RD cost function is desired. However, the exact RD cost is difficult to characterize during transform learning. For this reason, a proxy cost function is desirable. While other proxies are possible (e.g., $l_0$ norm), a weighted sum of square transform coefficients where the weights are increasing number from the sine function is used by example. By example, a cost function C of the block x in view of the transform U may be defined as follows.

$$C(U,x) = \sum_{i=1}^{n} w_i (u_i^T x)^2$$

In the foregoing, $w_i$ represents weights to be applied to respective transform coefficients in the calculation. In an example, the weights $w_i$ may be determined as follows.

$$w_i = 2 - 2\cos((2i-1)\pi/2n)$$

The training blocks, which are 2D, may be classified based on their 1D transforms, either row or column. In an example using only the DCT and an initialized transformation matrix (MDTX), a 4×4 training block Y may have the following data.

$$Y = (y_1, y_2, y_3, y_4) = \begin{bmatrix} -1 & -1 & 0 & 1 \\ 0 & 2 & 3 & 2 \\ 1 & 1 & 3 & 2 \\ 1 & 2 & 3 & 3 \end{bmatrix}$$

In the foregoing, $y_1, y_2, y_3, y_4$ represent four 1D column signals of the training block Y.

A column transform of the DCT used to classify this training block is represented as follows.

$$U_{DCT} = \begin{bmatrix} 0.5000 & 0.6533 & 0.5000 & 0.2706 \\ 0.5000 & 0.2706 & -0.5000 & -0.6533 \\ 0.5000 & -0.2706 & -0.5000 & 0.6533 \\ 0.5000 & -0.6533 & 0.5000 & -0.2706 \end{bmatrix}$$

A column transform of MDTX used to classify this training block is represented as follows.

$$U_{MDTX} = \begin{bmatrix} 0.1379 & 0.3928 & 0.5879 & 0.6935 \\ 0.3928 & 0.6935 & 0.1379 & -0.5879 \\ 0.5879 & 0.1379 & -0.6935 & 0.3928 \\ 0.6935 & -0.5879 & 0.3928 & -0.1379 \end{bmatrix}$$

The cost for each of the four 1D column signals of the training block Y are $C(U_{MPTX}, y_1)=4$, $C(U_{MPTX}, y_2)=13$, $C(U_{MPTX}, y_3)=9$, $C(U_{MPTX}, y_4)=4$; and $C(U_{DCT}, y_1)=3.85$, $C(U_{DCT}, y_2)=15.16$, $C(U_{DCT}, y_3)=16.58$, $C(U_{DCT}, y_4)=5.67$.

The output of the cost function for each transform may be a combination of the cost for each column or row signal. In this example, an average cost of MDTX is 7.5, and an average cost of DCT is 10.31. Thus, training block Y may be classified as MDTX. Instead of classifying 2D training blocks based on their 1D transform types, 1D training blocks may be classified based on their 1D transform types, or 2D training blocks may be classified based on their 2D transform types.

Generating an updated transformation matrix using values of the training blocks classified in the learned transform set at 710 can include using the column or row signals as training samples for the updated transformation matrix. In the previous example, the column signals are used as training samples. Generating the updated transformation matrix can include generating the updated transformation matrix using the KLT. Stated generally, the column signals may be used to form vectors of the object in the image, determine the mean of the vectors, find the covariance matrix from the vectors and the mean, find the eigenvalues and then the eigenvectors from the covariance matrix, and form the transformation matrix using the eigenvectors. Further details of determining a KLT are not included herein to increase clarity. In some implementations, generating the updated transformation matrix may comprise determining a rate-distortion optimized transform according to any known technique, which generally includes learning a transform with multiple transform kernels by simulating a rate-distortion search for transform types during learning using the training samples. The learned transform and its flipped version may be learned together in this process.

The transformation matrix for the learned transform is updated at 701 using the updated transformation matrix generated at 710. The update may include replacing the transformation matrix with the updated transformation matrix for the next iteration starting at 708, where the training blocks are re-classified. Classifying the training blocks by transform at 708, generating an updated transformation matrix at 710, and updating the transformation matrix at 712 continue for a plurality of iterations. In some implementations, the plurality of iterations ends when a solution for the transformation matrix converges at 714. The solution may converge when the elements of the updated transformation matrix in the current iteration differ from elements of the transformation matrix (e.g., the updated transformation from the previous iteration) by less than a defined value (e.g., sum of absolute differences, etc.).

After the iterations for the current prediction mode have ended at 714, the results may be used to generate transform types for the prediction mode. When the prediction mode is the inter-prediction mode, the first fixed transforms are assigned to respective first fixed transform types, the transformation matrix is assigned to a first learned transform, and the first learned transform and a flipped transform of the first learned transform are assigned to first mode-dependent transform types, each including at least one of the first learned transform or the flipped transform of the first learned transform. Continuing the example above, the first fixed transforms are DCT, ADST, FLIPADST, and IDTX, so the first fixed transform types may include the 16 transform types previously described. The first fixed transform, MDTX1, and its flipped transform, FMDTX1, are assigned to the first mode-dependent types in combination with each other or with one or more of the fixed transforms, such as DCT as described in the above example.

When the prediction mode is the intra-prediction mode, the second fixed transforms are assigned to respective second fixed transform types, the transformation matrix is assigned to a second learned transform, and the second learned transform is assigned to second mode-dependent transform types, each including at least the second learned transform. In this example, the second fixed transforms DCT, ADST, and IDTX may be assigned in combination to 7 different transform types. The second learned transform, denoted MDTX2 in certain examples described herein, may be assigned to a second mode-dependent type such as MDTX2_MDTX2, assigned to a second mode-dependent in combination with one or more of the fixed transforms, such as DCT, to form MDTX2_DCT or DC_MDTX2 as described in the above example, or both.

If there are additional prediction modes at 716, the method 700 returns to 704 for processing of the next prediction mode. Some or all prediction modes are considered as described above. The method 700 may be repeated for different prediction residual sizes, using the same, some of the same, or completely different transforms. The method 700 stores or transmits, for coding blocks, a first plurality of available transform types for the inter-prediction mode that includes combinations of the first fixed transforms and the first mode-dependent transforms, and a second plurality of transform types for each of the plurality of intra-prediction modes that each include combinations of the second mode-dependent transforms and at least some of the second fixed transforms. The available transform types may be stored or transmitted as a table or otherwise in association with index values for use in signaling their use for particular frames, slices, blocks, etc.

The descriptions above generally describe square residuals for ease of explanation. However, the learned transforms may be applied for various residual sizes. For example, for a 4×8 residual or an 8×4 residual, a length 4 MDTX may be applied in one direction, and a length 8 MDTX in the other. That is, it is possible to apply length 4 MDTX vertically and length 8 MDTX horizontally for an 8×4 residual and the opposite for a 4×8 residual when the transform type is MDTX_MDTX (which represents whichever of MDTX1_MDTX1 or MDTX2_MDTX2 is applicable). For non-square blocks with an edge length of 16, a trained or learned transform may be generated. Alternatively, another fixed transform that is not included in the first plurality of transform types, the second plurality of transform types, or both, may be used for such a block. For example, a modified ADST referred to at DST-7 may be used. In this example, if the MDTX_MDTX is the transform type tested for a 16×4 residual block, a length 16 DST-7 may be used for rows, and the length 4 MDTX may be used for columns (i.e., MDTX1 or MDTX2, depending upon the prediction mode).

For simplicity of explanation, methods accordingly to the teachings herein are depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Using the transforms learned according to the teachings herein for intra-prediction modes that are currently included in the AV1 codec and for the inter-prediction mode resulted in the selection of transform types including the learned transforms at rates between a minimum of about 15% and a maximum of about 46% for intra-prediction modes with a block length n of 8, and between a minimum of about 30% and a maximum of about 45% for inter-prediction modes with block lengths n of 4 and 8. These selections represent a consistent gain in the Bjontegaard rate difference (BD rate).

In a variation of the processing herein, reduced processing time may result from pruning the one or more of the least frequently chosen transforms for each mode based on, for example, experimental data. This reduces the processing required to determine the transform type, such as described above with regards to the determinations at 606 and 608 of the method 600, because fewer modes are tested. Further, reducing the number of transforms can, in some implementations, reduce the signaling (e.g., flags and/or indicators) needed to identify the transform mode to a decoder for any particular block.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 or the decoder 500, or another encoder or decoder as disclosed herein) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102 can encode content into an encoded video signal and transmit the encoded video signal to the communications device. In turn, the communications device can then decode the encoded video signal. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for decoding video data from a video bitstream, the method comprising:
   for a respective block of a plurality of blocks encoded into the video bitstream using a prediction mode:
   determining a transform mode for the block using the prediction mode, wherein:
      the transform mode comprises a first transform mode responsive to the prediction mode being an inter-prediction mode,
      the transform mode comprises a second transform mode responsive to the prediction mode being an intra-prediction mode of a plurality of available intra-prediction modes,
      the first transform mode comprises one of a plurality of available first transform types, each of the plurality of available first transform types comprising respective combinations of transforms selected from the group consisting of:
         first fixed transforms, each comprising a respective fixed transformation matrix, and
         first mode-dependent, learned transforms, each comprising a respective transformation matrix that was generated iteratively using blocks predicted using the inter-prediction mode,
      the second transform mode comprises one of a plurality of available second transform types, each of the plurality of available second transform types comprising respective combinations of transforms selected from the group consisting of:
         second fixed transforms, each comprising a respective fixed transformation matrix, wherein the second fixed transforms comprise a proper subset of the first fixed transforms, and
         a second mode-dependent, learned transform comprising a transformation matrix that is generated iteratively using blocks predicted using the intra-prediction mode; and
   decoding the block using the prediction mode and the transform mode.

2. The method of claim 1, wherein the available first transform types is greater in number than the available second transform types.

3. The method of claim 1, wherein the first mode-dependent, learned transforms include a first learned transform and a flipped version of the first learned transform, the second mode-dependent, learned transform includes a second learned transform, and the available second transform types omit a flipped version of the second learned transform.

4. The method of claim 1, wherein:
each of the first mode-dependent, learned transforms comprises a one-dimensional (1D) transform,
the available first transform types comprise combinations of a vertical transform and a horizontal transform, and
the vertical transform of a proper subset of the available first transform types includes at least one of the 1D transform or a flipped transform of the 1D transform.

5. The method of claim 4, wherein:
the first fixed transforms include a discrete cosine transform (DCT), and
the horizontal transform of the proper subset of the available first transform types includes the DCT.

6. The method of claim 1, wherein:
each of the first mode-dependent, learned transforms comprises a one-dimensional (1D) transform,
the available first transform types comprise combinations of a vertical transform and a horizontal transform, and
the horizontal transform of a proper subset of the available first transform types includes one of the 1D transform or a flipped transform of the 1D transform.

7. The method of claim 6, wherein:
the first fixed transforms include a discrete cosine transform (DCT), and
the vertical transform of the proper subset of the available first transform types includes the DCT.

8. An apparatus for decoding video data from a video bitstream, the apparatus comprising:
a processor configured to:
for a block of a plurality of blocks encoded into the video bitstream using a prediction mode:
determine a transform mode for the block using the prediction mode, wherein:
the transform mode comprises a first transform mode responsive to the prediction mode being an inter-prediction mode,
the transform mode comprises a second transform mode responsive to the prediction mode being an intra-prediction mode of a plurality of available intra-prediction modes,
the first transform mode comprises one of a plurality of available first transform types, each of the plurality of available first transform types comprising respective combinations of transforms selected from the group consisting of:
first fixed transforms, each comprising a respective fixed transformation matrix, and
first mode-dependent, learned transforms, each comprising a respective transformation matrix that was generated iteratively using blocks predicted using the inter-prediction mode,
the second transform mode comprises one of a plurality of available second transform types, each of the plurality of available second transform types comprising respective combinations of transforms selected from the group consisting of:
second fixed transforms, each comprising a respective fixed transformation matrix, wherein the second fixed transforms comprise a proper subset of the first fixed transforms, and
a second mode-dependent, learned transform comprising a transformation matrix that is generated iteratively using blocks predicted using the intra-prediction mode; and
decode the block using the prediction mode and the transform mode.

9. The apparatus of claim 8, wherein the available first transform types is greater in number than the available second transform types.

10. The apparatus of claim 8, wherein:
the first mode-dependent, learned transforms include a first learned transform,
the available first transform types each include at least one of first learned transform or a flipped version of the first learned transform,
the second mode-dependent, learned transform includes a second learned transform, and
the available second transform types omit a flipped version of the second learned transform.

11. The apparatus of claim 8, wherein:
the second, mode-dependent learned transform is one a plurality of second, mode-dependent learned transforms, each generated iteratively using blocks predicted using a respective intra-prediction mode of the available intra-prediction modes,
the second mode-dependent, learned transform comprises a one-dimensional (1D) transform,
the available second transform types comprise combinations of a vertical transform and a horizontal transform, and
the vertical transform of a proper subset of the available second transform types includes the 1D transform.

12. The apparatus of claim 8, wherein:
the second, mode-dependent learned transform is one a plurality of second, mode-dependent learned transforms, each generated iteratively using blocks predicted using a respective intra-prediction mode of the plurality of available intra-prediction modes,
the second mode-dependent, learned transform comprises a one-dimensional (1D) transform,
the available second transform types comprise combinations of a vertical transform and a horizontal transform, and
the horizontal transform of a proper subset of the available second transform types includes the 1D transform.

13. The apparatus of claim 8, wherein the processor is configured to:
receive, from the video bitstream, a header associated with the block; and
determine, from the header, the prediction mode, wherein to determine the transform mode comprises to:
determine, from the prediction mode, that the transform mode is the first transform mode, and
determine, from the header, that the first transform mode includes a first transform of the first mode-dependent, learned transforms.

14. The apparatus of claim 8, wherein:
the first fixed transforms comprise a discrete cosine transform (DCT), an asymmetric discrete sine transform (ADST), a flipped ADST (FLIPADST), and an identity transform,
a first mode-dependent, learned transforms comprise a first learned transform (MDTX1) and a flipped MDTX1 (FMDTX1),
the available first transform types comprise combinations of transforms selected from the group consisting of the DCT, the ADST, the FLIPADST, and the identity transform, and combinations of transforms selected from the group consisting of the MDTX1, the FMDTX1, and the DCT, the second fixed transforms comprise the DCT, the ADST, and the identity transform, and omit the FLIPADST, the second mode-dependent, learned transform comprises a second learned transform (MDTX2), and the available second transform types comprise combinations of transforms selected from the group consisting of the DCT, the ADST, and the identity transform, and combinations of transforms selected from the group consisting of the MDTX2 and the DCT.

15. The apparatus of claim 8, wherein:

the available first transform types for a proper subset of the available intra-prediction modes comprise only the first fixed transforms, and the available first transform types for remaining intra-prediction modes of the available intra-prediction modes comprise at least a first learned transform of the first mode-dependent, learned transforms.

16. The apparatus of claim 15, wherein:

at least some of the available first transform types for remaining intra-prediction modes of the available intra-prediction modes comprise a discrete cosine transform (DCT).

17. The apparatus of claim 16, wherein the first fixed transforms comprise the DCT, an asymmetric discrete sine transform (ADST), a flipped ADST (FLIPADST), and an identity transform.

18. An apparatus for encoding video data into a video bitstream, the apparatus comprising:

a processor configured to, for a respective block of a plurality of blocks of the video data:

determine a transform mode for the block using a prediction mode for the block, wherein:

the transform mode comprises a first transform mode responsive to the prediction mode being an inter-prediction mode, the transform mode comprises a second transform mode responsive to the prediction mode being an intra-prediction mode of a plurality of available intra-prediction modes, the first transform mode comprises one of a plurality of available first transform types, each of the available first transform types comprising respective combinations of transforms selected from the group consisting of:

first fixed transforms, each comprising a respective fixed transformation matrix, and first mode-dependent, learned transforms, each comprising a respective transformation matrix that was generated iteratively using blocks predicted using the inter-prediction mode, the second transform mode comprises one of a plurality of available second transform types, each of the available second transform types comprising respective combinations of transforms selected from the group consisting of:

second fixed transforms, each comprising a respective fixed transformation matrix, wherein the second fixed transforms comprise a proper subset of the first fixed transforms, and a second mode-dependent, learned transform comprising a transformation matrix that is generated iteratively using blocks predicted using the intra-prediction mode; and encode the block into the video bitstream using the prediction mode and the transform mode.

19. The apparatus of claim 18, wherein the available first transform types is greater in number than the available second transform types.

20. The apparatus of claim 18, wherein the processor is configured to:

when the transform mode is the second transform mode:

encode, in a header associated with the block, a flag that indicates whether the transform mode includes the second mode-dependent transform; and encode, in the header associated with the block, bits indicating the transform mode from an index including those of the available second transform types including only the first fixed transforms or an index including those of the available second transform types including the second mode-dependent transform.

* * * * *